July 3, 1934.   G. TRAUTVETTER   1,965,014
WEATHER SEAL FOR VEHICLE BODY CLOSURES
Filed July 6, 1931

INVENTOR.
GEORGE TRAUTVETTER
BY
ATTORNEY.

Patented July 3, 1934

1,965,014

UNITED STATES PATENT OFFICE 1,965,014

WEATHER SEAL FOR VEHICLE BODY CLOSURES

George Trautvetter, Philadelphia, Pa., assignor to Edward G. Budd Manufacturing Company, Philadelphia, Pa., a corporation of Pennsylvania Application July 6, 1931, Serial No. 548,722

2 Claims. (Cl. 296—44)

The invention relates to door closures for vehicle bodies and particularly to a device for rendering the edge portion of the closure weatherproof.

Heretofore it has always been rather difficult to obtain an efficient weather seal at the sides and top of the door of a vehicle body where it closes against the door frame. It is an object of my invention to provide a simple and inexpensive and readily applied means for weatherproofing door closures, and I attain this object in the manner specifically pointed out in the following specification and claims.

Figure 1:
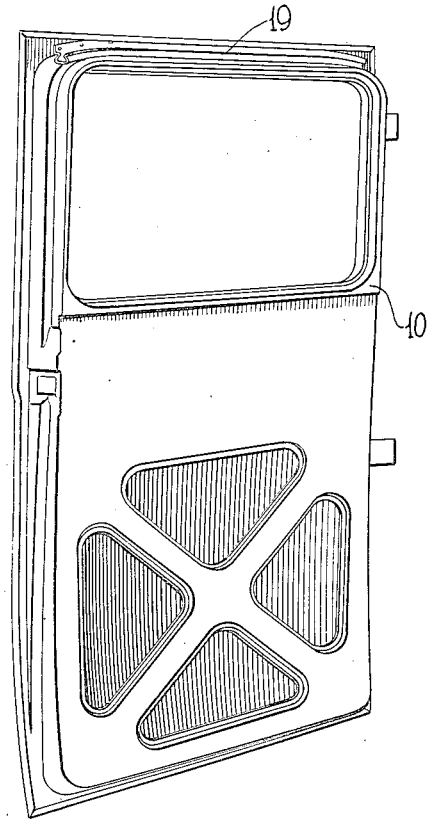
Fig. 1 is a view in perspective of the inner side of a door to which the invention has been applied, the weather strip, itself, being omitted.
Figure 2:
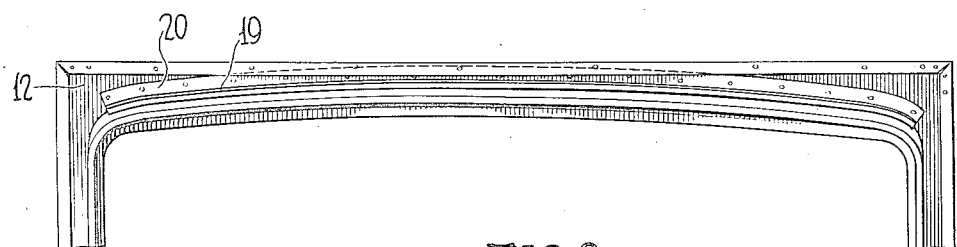
Fig. 2 is an inside elevational view on an enlarged scale of the top of the door shown in Fig. 1.
Figure 3:
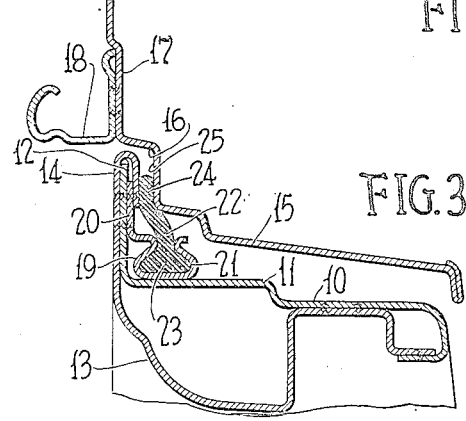
Fig. 3 is a view in cross section through the top rail of the door and the adjacent door frame showing the door closed and the weather seal in operative position, closing the space between the edge of the door and the frame.

The weather seal of my invention is particularly adapted for application to the top of a door but it will be understood that it can, under certain conditions, be applied also to other portions of a closure and to closures other than a door.

It is particularly adapted to be used, however, in connection with doors or closures having an overlapping edge flange overlapping a portion of the door or closure frame.

In the drawing, the door construction to which I have shown the invention applied includes an inner panel designated generally as 10, having a transversely extending jamb rail portion 11, and a laterally extending overlap flange 12. It is reinforced by an outer finish panel 13 having its edge 14 crimped over the edge of the overlap flange 12 and secured thereto.

The edge 12, 14 of the door closes against a frame member having a transverse jamb face portion 15 and an outer rabbet 16 receiving the edge flange of the door. The rabbet portion is extended upwardly by a portion 17 forming the outer face of the body above the door opening and against this upwardly extending portion is secured the drip channel 18.

The weather seal of my invention comprises a thin sheet metal strip 19 conforming to the contour of the transverse portions 11 and 15 of the door and frame, which in this case, are shown as being curvilinear in form. This strip is provided with an upstanding flange 20 adapted to seat against and be secured to the flange 12 of the door rail by spot welding and an upwardly facing channel 21 having side walls inclined inwardly, the bottom of this channel seating upon the transverse portion 11 of the door rail.

A weather strip 22 having a base portion 23 fitting the channel 21 and held therein by the constricted side walls is slid into the channel from one end. This strip has an upwardly extending portion 24 projecting when the door is closed into the space between the door edge flange and the vertical wall 25 of the rabbet 16 of the frame and forming an effective weather seal between the edge of the door and the frame. The strip 22 is preferably of a yielding material, such as rubber, and acts also to provide a cushion, silencing the closing of the door, and yielding to slight irregularities in the joint between the door and door frame. Normally the upstanding portion 24 of the weather strip is spaced slightly from the vertical flange 12, 14 of the door, so that even if the flange 12, 14 does not close squarely against the wall 25 of the rabbet, the strip portion 24 closes against it and prevents the entrance of wind and water.

What I claim is:

1. The combination with a vehicle door top rail having a transversely extending jamb face portion and an upwardly extending flange adapted to close against a recessed door frame, of a channel strip having a widened base seated on the jamb face portion inwardly of said flange and a constricted opening spaced from said flange an appreciable distance, and a resilient strip having a widened base portion fitting in the channel, and a relatively thin flexible tongue projecting through said constricted opening and upwardly therefrom a substantial distance, whereby it is adapted to engage the recessed door frame in advance of the complete closure of the door and form a weather seal between the door flange and the recessed door frame when the door is closed.

2. In combination, a vehicle door frame having a transversely extending main jamb portion provided with an upward offset in its outer portion, a door having a top jamb rail including a transversely extending portion and an upwardly extending flange adapted, respectively, to close against said main jamb portion and the offset therein, the outer portion of the transversely extending portion of the door rail being spaced, when the door is closed, a substantial distance from the adjacent portion of the transversely extending main jamb portion of the door frame, a channel seated on the outer portion of the transversely extending door rail portion and adapted, when the door is closed, to be received in said space, and a weather strip having a widened base secured in said channel, and a flexible upwardly extending tongue having its base spaced from said flange and its body extending into the space between the offset in the frame and the flange on the door thereby arranged to engage the recessed door frame in advance of the complete closure of the door and forming a weather seal when the door is closed.

GEORGE TRAUTVETTER.